United States Patent Office 3,098,099
Patented July 16, 1963

3,098,099
ESTER-KETONE CONVERSION
Louis B. Conte, Jr., Newark, and Francis N. Apel, Nutley, N.J., assignors to Union Carbide Corporation, a corporation of New York
No Drawing. Filed Apr. 19, 1960, Ser. No. 23,127
6 Claims. (Cl. 260—590)

This invention relates to the conversion of esters of phenols into phenolic ketones and, more particularly, to an improved catalytic method for the conversion.

The conversion of esters of phenols into phenolic ketones (Fries rearrangement) by the action of aluminum chloride and similar catalysts has long been known [K. Fries and G. Finck, Ber. 41 4271 (1908)]. The reaction proceeds as follows:

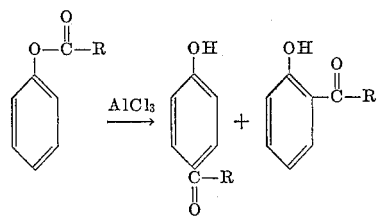

for conversion of monoesters of phenols to mono-ketophenols; and

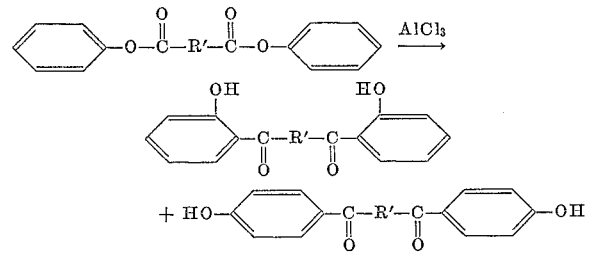

for conversion of diesters of phenols to di-keto-phenols.

Preparation of phenolic ketones by the above conventional method is disadvantageous in several respects. The reaction scheme requires equimolar or greater quantities of anhydrous aluminum chloride per mole of ester of phenol; none of this catalyst is recoverable and hence, this route to phenolic ketones is quite expensive. Further, the product obtained is a catalyst-product complex consisting of aluminum chloride and the phenolic ketone from which isolation of the product is difficult. Hydrolysis with dilute acid to decompose the complex followed by separation of the crude product from hydrolysis products and additional washing and purification by distillation or crystallization is required to obtain a satisfactorily pure product. Obviously, these operations are time consuming and costly.

It is an object, therefore, of the present invention to provide a method for the conversion of esters of phenols into phenolic ketones which is simple, inexpensive in terms of catalyst required, and which provides high yields of a pure product.

It is another object to provide a method for the conversion of esters of phenols into phenolic ketones wherein the product is readily separated from the catalyst by mechanical means and the catalyst is recoverable and reusable.

We have now discovered that these and other objects of the invention are achieved by heating a solution of an ester of a phenol to above about 25° C. in contact with a catalyst comprising a substantially insoluble polymeric cation exchanging resin under substantially anhydrous conditions until at least a portion of the ester is converted and thereafter separating the phenolic ketone product from the catalyst, solvent and unconverted ester of phenol.

The use of a substantially insoluble polymeric cation exchanging resin as a catalyst in accordance with the method of this invention provides many benefits over methods heretofore known to convert esters of phenols into phenolic ketones. Among these benefits are (1) separation of the product by mechanical means, such as filtration because catalyst-product complexes are not formed; (2) elimination of costly hydrolysis, and resultant washing and purification steps; (3) ease of recovery of the catalyst by physical separation from the product; (4) virtually infinite reusability of the catalyst since the catalyst resins do not change as a result of the reaction; (5) long life of the cation exchanging resins without loss of activity which makes their use economical; and (6) fewer side reactions and hence, greater yields of more pure product.

The catalysts used in the method of the present invention are strongly acidic cation exchange resins having chemically bound thereto cation exchanging groups. Suitable exchanging groups are strong acid groups such as sulfonic acid groups which exhibit strong exchange potential wtih cations, such as $Na^+$ and $Ca^{++}$.

The exchange capacity of these cation exchanging resins is determined essentially by the number of acidic groups attached to the polymeric resin skeleton per unit weight. However, the catalytic effectiveness of the resin in the present method is only partly determined by its exchange capacity. Of equal importance is the availability of these cation exchanging groups to contact with the reactants.

Thus, to be effective in this method, cation exchanging groups must be on the surface of the resin structure. It is not necessary that the resin structure be in any particular form, but it is desirable to have the greatest possible surface area on the catalyst to secure exposure of the greatest number of cation exchanging groups to the reactants. The catalyst structure, hence, is advantageously made as fine as possible, for instance in microspheres or beads, to increase total surface area, or it can be made porous. Where porous resin structures are employed, the pores should be large enough to permit free passage of molecules of the reactant and product.

The particular polymeric structure to which the cation exchanging groups are attached is not critical in the present method. It should be such, however, as will render the polymeric structure substantially insoluble in the reaction mixture and in any organic liquids to which the catalyst might normally be exposed. Cross-linked resins effectively provide the insolubility feature required of these resins, although other factors, such as crystallization forces, are sometimes powerful enough to insure insolubility without actual cross-linking. Highly successful results are secured with styrene-divinylbenzene sulfonated resins, sulfonated cross-linked styrene polymers, phenol-formaldehyde sulfonic acid resins, benzene-formaldehyde-sulfonic acid resins and the like. Such resins have been sold and marketed by several companies under various brand names. For instance, Rohm & Haas Company's Amberlite XE–100, a sulfonated styrene-divinylbenzene resin is highly successful in this process, as are other sulfonated ion exchanging resins such as Dow Chemical Company's Dowex-50W and Dowex-50-X, Permutit Company's Permutit QH, and Chemical Process Company's Chempro C–20.

Prior to use in the method of this invention these cation exchange resins must be in the hydrogen ($H^+$) form. Some of these resins are marketed in the salt form and must be treated before use to convert the ion exchange groups into the acid form. This can be easily effected with sulfuric acid or hydrochloric acid and the like. An excess of acid is generally used. Afterward, the excess acid is washed out with water or suitable solvent to remove the released salts.

In such treatment, water, if employed, disperses within and to some extent swells the resin network. It has been found that the presence of such water within the polymeric network of the cation exchange resin has an undesirable effect on the catalytic activity of the resin. For best results this water should be displaced to less than about 2 and preferably 0.1 percent by weight in order to secure maximum rate in the conversion. In the present specification and claims cation exchange resins containing less than about 2 weight percent water are termed "substantially anhydrous" and catalysts comprising such resins are herein termed "substantially anhydrous catalysts." Cation exchange resins containing less than about 0.1 weight percent water are termed "anhydrous" and catalysts comprising such resins are herein termed "anhydrous catalysts." It is essential in our method that the catalyst be at least substantially anhydrous. This condition can be achieved by a variety of means, such as by drying the resin in an oven immediately prior to use. During use the resin should be kept out of contact with high moisture content environments.

Displacement of the water to achieve substantially anhydrous or anhydrous conditions can be accomplished in several ways other than by drying. For example, the water can be displaced by a solvent through distillation or diffusion techniques, or the resin can be dried and then allowed to soak in liquid solvent until saturated. This forms a very effective catalyst. The use of solvent saturated resins is preferred because the problem of moisture adsorption prior to and during use is obviated and strict control over the reaction environment is unnecessary. Without displacement of most of the water, that is to less than about 2 weight percent, the cation exchange resins exhibit lessened catalytic activity. We do not desire to be bound by any particular theory of operation, but it is believed that the water within the framework of the resin catalyst forms an effective shield around the cation exchanging groups attached to the resin structure and retards the catalytic effect of these groups in nonaqueous reaction media. Replacement of this water with a solvent tremendously increases the availability of these cation exchanging groups to such an extent that the resin then becomes a highly effective catalyst for the conversion.

As the solvent for displacing the water in the cation exchange resin, any organic liquid which is inert and does not retard the conversion is suitable. We prefer mononuclear phenols, especially phenol itself and the cresols. A resin saturated with phenol to reduce the water content of less than 0.1 percent by weight is a highly effective catalyst and is particularly preferred for use in the method of our invention.

Temperatures useful in effecting the conversion of esters of phenols into phenolic ketones by the method of this invention range from about 40° C. to about 120° C. Temperatures lower than about 40° C. are suitable unless the solvent used to displace water in the resin crystallizes. For instance, phenol at less than 40° C. clogs the passages through the catalyst and reduces the contact between the catalyst and reactants. Degradation of the resin is likely to occur at temperatures much above about 120° C. and hence temperatures much in excess of this temperature are to be avoided.

The entirety of the broad class of esters of phenols can be converted into phenolic ketones by the method of the present invention. More particularly, esters of phenols falling within the generic class having the formula (I)

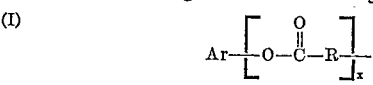

where $x$ is 1 or 2 and Ar is representative of a mononuclear or polynuclear aromatic group having a valence equal to $x$ which can be substituted in one or more positions with inert substituents, for instance hydrocarbon groups as alkyl, alkenyl, aryl, aralkyl and the like; oxyhydrocarbon groups such as alkoxy, alkoxyaryl groups and the like; or halogen groups such as chloro- and bromo-groups and the like. Preferred as the aromatic group, Ar, are benzene rings substituted in either the 2 or 4 position with an alkyl group having from 1 to about 10 carbon atoms, and dinuclear benzene compounds substituted in the two and/or four positions with alkyl groups having from 1 to about 10 carbon atoms. The R group attached to the acyl radical in the above formula is a hydrocarbon group such as alkyl, aryl, alkaryl, aralkyl, and like groups; an oxy- or hydroxyhydrocarbon group such as alkoxyaryl and hydroxyaryl and like groups. Preferred as R are alkyl groups having up to 10 carbon atoms.

Specific esters of phenols which are deserving of mention are:

I. Among the esters of phenol the alkyl esters, particularly those having $CH_3$, $C_3H_7$, $C_5H_{11}$, $C_6H_{13}$, $C_{11}H_{23}$, $C_{13}H_{27}$, $C_{15}H_{31}$, $C_{17}H_{35}$ and like groups as R of Formula I; the aryl esters such as those having $C_6H_4OCH_3$ groups as R of Formula I.

II. Among the esters of monosubstituted phenols those having as substituents in the 2, 3 or 4 positions alkyl groups such as $CH_3$, $C_2H_5$, $C_3H_7$ groups; alkaryl groups such as $C_6H_5$—$CH_2$ and $C_6H_5CH_2CH_2$ groups; halogen groups such as Cl groups and having as R in Formula I alkyl groups such as $CH_3$, $C_2H_5$, $C_3H_7$, $C_4H_9$, $C_5H_{11}$, $C_6H_{13}$, $C_7H_{15}$, $C_8H_{17}$ and like groups; haloalkyl groups such as $CH_2Cl$ and like groups; aryl groups such as $C_6H_5$ groups and like groups.

III. Among the esters of disubstituted phenols the esters of dialkyl substituted phenols such as 2,3-dimethyl-2,4-dimethyl-, 2-methyl-4-ethyl-, 2-ethyl-4-propyl-, 2,5-dimethyl-, 2-ethyl-4-methyl-2,4-diethyl-, 2-methyl-4-butyl-2-ethyl-5-methyl-, 2-methyl-5-isopropyl-, 2-propyl-5-methyl-2-isopropyl-5-methyl-, 2,6-dimethyl-, 2-methyl-6-ethyl-, 2,6-diethyl-, 2-methyl-6-propyl-, 3,4-dimethyl-, 3-methyl-4-ethyl-, 3,5-dimethyl- and 3,5-diethylphenols; the esters of monochloromonoalkyl substituted phenols such as 2-chloro-4-methyl-2-ethyl-4-chloro and 3-chloro-4-methylphenols; having as R of Formula I alkyl groups such as $CH_3$, $C_2H_5$, $C_3H_7$, $C_6H_{13}$, $C_{11}H_{23}$ and like alkyl groups; aryl groups such as $C_6H_5$ and the like; alkenylaryl groups such as $C_6H_5CH\!\!=\!\!CH$ and like groups.

IV. Among the esters of trisubstituted phenols the acetate and like esters of 2,3,4-trimethyl, 2,3,5-trimethyl, 2,4,5-trimethyl, 2,4-dimethyl-5-ethyl, 2-ethyl-4,5-dimethyl, 2,4-diethyl-5-methyl, 3,4,5-trimethyl, 2,4,6-trimethyl, 2,4-dimethyl-6-ethyl, 2,6-dimethyl-4-ethyl, 2-methyl-4,6-diethyl, 2,6-diethyl-4-methyl, 2,6-dimethyl-4-propyl, 2,6-dimethyl-4-butyl, 2-methyl-4-ethyl-6-allyl, 2-methyl-4-ethyl-6-propyl, 2-methyl-4-propyl-6-ethyl, 2,4,6-triethyl, 2-methyl-4-butyl-6-ethyl, 2,6-dimethyl-4-benzyl, 2,4-dimethyl-6-heptyl, 2,6-dimethyl-4-heptyl, 2-methyl-4-ethyl-6-benzyl, 2-methyl-4-heptyl-6-ethyl, 2,6-dimethyl-4-dodecyl, and 2-methyl-4-dodecyl-6-ethyl phenols;

V. Among the esters of polyhydroxy benzenes: catechol diacetate, catechol dipropionate, catechol dibutyrate, catechol divalerate, catechol diisovalerate, catechol dicaproate, catechol diisocaproate, catechol dibenzoate, catechol distearate, guaiacol acetate, guaiacol propionate, guaiacol butyrate, guaiacol caproate, guaiacol heptanolate, resorcinol diacetate, resorcinol monomethyl ether acetate, 4-ethylresorcinol diacetate, 4-ethylresorcinol dipropionate, 4-propylresorcinol diacetate, 5-methylresorcinol, 1-acetate 3-monomethyl ether, 4-benzylresorcinol diacetate, hydroquinone diacetate, hydroquinone dipropionate, pyrogallol triacetate, pyrogallol monoacetate dimethylether (1,2,3), pyrogallol monoacetate dimethylether (1,2,6), pyrogallol monochloroacetate dimethylether (1,2,6), trihydroxybenzene, 1,4-diacetate-2-methyl ether, phloroglucinol triacetate, and phloroglucinol tribenzoate, and the like;

VI. Among the esters of polynuclear phenol compounds: α-naphthyl acetate, α-naphthyl propionate, α- naphthyl butyrate, α-naphthyl valerate, α-naphthyl phenylacetate, α-naphthyl benzoate, β-naphthyl acetate, β-naphthyl chloroacetate, 2-hydroxybiphenyl acetate, 2-hydroxybiphenyl propionate, 2-hydroxybiphenyl butyrate, 2-hydroxybiphenyl valerate, 3-hydroxybiphenyl propionate, 4-hydroxybiphenyl acetate, 4-hydroxybiphenyl benzoate, 3-hydroxyphenanthrene acetate, 9-hydroxyphenanthrene acetate, 2-hydroxy-9,10-dihydrophenanthrene acetate, 4-methyl-5-hydroxy-coumarin acetate, 4-methyl-7-hydroxy-coumarin acetate, 4-methyl-7-hydroxy-coumarin propionate, 4-methyl-7-hydroxy-coumarin-benzoate, 4-methyl-7-hydroxy-coumarin p-toluate, 4-methyl-7-hydroxy-coumarin acetate, 4-phenyl-7-hydroxy-coumarin benzoate, 4-p-bromophenyl-7-hydroxycoumarin acetate, 4-p-tolyl-7-hydroxy-coumarin acetate;

VII. Also acetylsalicylic acid and caproylsalicylic acid methyl esters, 2-acetyl-4-methylphenyl acetate, phenyl-o-(anisoyl)benzoate, and diphenyl phthalate, and the like.

The above list of specific phenols is merely illustrative of some of the better known esters of phenols and is not intended nor should it be construed as limitative of the generic sense of the term "esters of phenols."

Esters of phenols can be converted to the corresponding ketones using ion exchange catalysts in either continuous, semi-continuous or in batch type conversions. Contact time of the ester of phenol as a minimum is the time required to initiate phenolic ketone formation. As a maximum contact time is sufficient to convert substantially all the ester of phenol to phenolic ketone. In some conversions, e.g., continuous conversions, incomplete conversion, i.e., about 20% to about 80% of ester of phenol to phenolic ketone is preferred. Particularly preferred are conversions of approximately 50% per pass.

In carrying out our method the ester of a phenol to be converted is contacted with the catalyst as a solution of the ester in an inert liquid organic solvent. Preferably the ester of phenol is dissolved in such solvent that the possibility of ester interchange during the conversion is minimized. Thus, it is a preferred procedure to form a solution of phenyl acetate in phenol, o-cresyl acetate in o-cresol, etc., prior to contacting the ester of phenol with the resin catalyst. The use of inert liquid organic solvents not analogous to the ester to dissolve the esters prior to contact with the catalyst provides conversions to the corresponding keto-phenols, but higher temperatures are required and longer reaction times, and yields are generally lower.

The product obtained in converting unsubstituted phenolic esters or phenolic diesters is generally a mixture of ortho- and para-keto-phenols; ortho- or para-substituted esters of phenols or diesters of phenols are converted to chiefly para- or ortho-keto phenols respectively.

To isolate the final product, the catalyst is first separated from the reactant, solvent and product of the reaction by mechanical means such as filtration, centrifugation and the like. The filtrate from this step, comprising reactant, product and reaction solvent and solvent from washings of the catalyst is distilled to effect final separation of the product. Reduced pressures facilitate this separation. Any other means of separating the product, e.g., crystallization, can also be used.

In a preferred embodiment the method of this invention comprises the steps of placing a dilute solution containing less than 50 percent and preferably from 10 to 25 weight percent of an ester of a phenol in a suitable solvent in contact with a solvent saturated polymeric cation exchange resin, moving the solution of ester of phenol through and around the solid catalyst as by agitation or circulation to insure adequate contact at about 60° C. to 110° C. and preferably from 85° C. to 90° C. under atmospheric pressure for several hours until substantially all the ester has been converted, separating the catalyst from the reaction mixture by filtration and removing any solvent and/or reactants from the product by distillation under reduced pressures, e.g., at about 150° C. and 1 mm. Hg.

The practice of the invention is illustrated and more particularly described in the following examples. All parts and percentages are by weight unless otherwise indicated.

In each of the examples the general procedure used was as follows:

A one-liter, 3-neck round bottom flask was equipped with a heating mantle, mechanical stirrer, dropping funnel, thermometer and reflux condenser with drying tube attachment. A strongly acidic cation exchange resin (Dowex 50–X–4 made by the nuclear sulfonation of styrene-divinylbenzene beads and comprising substantially styrene cross-linked with divinylbenzene) was dehydrated to less than 0.1% water. Air drying in shallow pans and heating with heptane as an organic solvent to remove the remaining water by azeotropic distillation effected the dehydration. The dry resin was then saturated with a suitable solvent to insure the continued absence of any significant amount (0.1 percent by weight) of moisture. The solvent-saturated resin was placed in the flask and heated to reaction temperature.

The ester of a phenol to be converted to the corresponding phenolic ketone was added dropwise as a 10–25 percent solution in a solvent which was the same or different from the solvent used to saturate the resin to the heated catalyst/solvent mixture. The reaction was carried out at varying temperatures and for varying lengths of time in the examples. After completion of the reaction period the catalyst was filtered off. The filtrate, containing unreacted ester of the phenol, solvent and phenolic ketone, was distilled under reduced pressures to isolate the product. Products were chemically tested for carbonyl content with 2,4-dinitrophenylhydrazine. In each instance strong positive tests were indicated by formation of a precipitate. Infrared spectra (2–15μ) absorption also indicated presence of carbonyl bonds.

EXAMPLE 1

*Conversion of Phenyl Acetate*

The cation exchange resin used weighed 250 grams. It was dried and saturated with phenol as solvent and placed in the reaction flask with an additional 470 grams of freshly distilled phenol. The mass was heated to 60–65° C. and dropwise addition of 68 grams of phenyl acetate was begun. After the addition, the reaction mixture was heated to 70–75° C. and maintained there for 18–20 hours. After filtration and washing of the catalyst with phenol, the filtrate and washings were distilled to 135–150° C. at 29 mm. Hg vacuum. A brown liquid product, a mixture of o- and p-hydroxyphenyl methyl ketone, was obtained. Yield was 40 percent based on the ester.

EXAMPLE 2

*Conversion of p-Cresyl Acetate*

Resin weighing 300 grams was dried and then saturated with p-cresol and placed in the reaction flask with 200 additional grams of p-cresol. Starting at 70–75° C., 75 grams of p-cresyl acetate was added dropwise. Reaction was carried on at 90–95° C. for 18–20 hours. Then the catalyst was filtered off and washed with p-cresol. Filtrate and washings were then distilled to 150° C. at 29 mm. Hg. A deep red product consisting of o-hydroxycresyl methyl ketone was obtained.

EXAMPLE 3

*Conversion of Di-p-Cresyl Sebacate*

Dowex 50–X–4 resin weighing 210 grams was saturated with p-cresol and added to the reaction flask with 200 additional grams of p-cresol. A solution of 48 grams of di-p-cresyl sebacate in 100 grams of p-cresol was added dropwise. Reaction was carried out at 110–115° C. for 18-20 hours. The catalyst was filtered off and washed. The filtrate and washings were distilled to 150° C. at 29 mm. Hg. A brown, crystalline residue product was obtained. This product was purified by dissolving in ethanol, in which di-p-cresyl sebacate is insoluble, filtering off the undissolved ester, and then distilling the ethanol from the filtrate. The liquid residue of diketo-phenol amounted to a 40 percent yield based on the ester.

Further purification was carried out by recrystallizing from toluene. The product melted at 125° C. and was identified as the crystalline o-keto-phenol, 1,10-(4-methyl-2-hydroxyphenyl) decanedione-1,10.

Identification was made by a mixed melting point with a known sample of 1,10-(4-methyl-2-hydroxyphenyl)-decanedione-1,10.

EXAMPLES 4-15

In the table following are given the salient data of other examples of conversions accomplished with the method of the present invention using the procedure of the previous examples.

TABLE I

| Example | Ester | Solvent | Temp., °C. | Hrs. Reaction Time | Percent Crude Yield Keto-Phenol |
|---|---|---|---|---|---|
| 4 | Phenyl Acetate | Phenol | 70-75 | 18-20 | 40 |
| 5 | ----do---- | Tetrachlorethane | 90-95 | 18-20 | 20 |
| 6 | o-Cresyl Acetate | o-Cresol | 90-95 | 18-20 | 75 |
| 7 | ----do---- | Tetrachlorethane | 80-95 | 7 | 35 |
| 8 | p-Cresyl Acetate | p-Cresol | 90-95 | 18-20 | 72 |
| 9 | Diphenyl Azelate | Phenol | 90-95 | 16-17 | 90 |
| 10 | ----do---- | n-Heptane | 98-99 | 7 | 25 |
| 11 | Diphenyl Oxalate | Phenol | 90-95 | 16-17 | 50 |
| 12 | Diphenyl Adipate | ----do---- | 90-95 | 17-18 | 70 |
| 13 | Di-p-Cresyl Sebacate | p-Cresol | 90-95 | 17-18 | 30 |
| 14 | ----do---- | ----do---- | 110-115 | 17-18 | 40 |
| 15 | Di-o-Cresyl Sebacate | o-Cresol | 90-95 | 18-20 | 100 |

From the above data it can be seen that phenol is the best solvent and 90-95° C. the best temperature of reactions; hence, they are preferred in the method of the present invention.

What is claimed is:

1. Method for converting esters of phenols into phenolic ketones which comprises contacting a solution in an inert liquid organic solvent of an ester of a phenol which has the formula

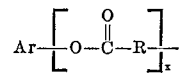

wherein $x$ is an integer from 1 to 2, Ar is an aromatic hydrocarbon radical having a valence equal to $x$ which can be substituted with at least one member of the class consisting of alkyl groups, alkenyl groups, aryl groups, aralkyl groups, alkoxy groups, alkoxyaryl groups and halogen groups, and R is selected from the class consisting of alkyl groups, aryl groups, alkaryl groups, aralkyl groups, alkenylaryl groups, alkoxyaryl groups, hydroxyaryl groups and haloalkyl groups with a strongly acidic polymeric cation exchange resin which is saturated with a liquid inert organic solvent, under substantially anhydrous conditions and at a temperature above 25° C. to convert said ester to the corresponding phenolic ketone and thereafter separating the phenolic ketone thus produced.

2. Method claimed in claim 1 wherein the reaction temperature is between 60 and 110° C.

3. Method claimed in claim 1 wherein the ester of phenol is phenyl acetate and the inert liquid organic solvent is phenol.

4. Method claimed in claim 1 wherein the ester of phenol is p-cresyl acetate and the inert liquid organic solvent is p-cresol.

5. Method claimed in claim 1 wherein the ester of phenol is di-p-cresyl sebacate and the inert liquid organic solvent is p-cresol.

6. Method claimed in claim 1 wherein the ester of phenol is di-o-cresyl sebacate and the inert liquid organic solvent is o-cresol.

References Cited in the file of this patent

FOREIGN PATENTS 287,967    Great Britain _____ Apr. 2, 1928

OTHER REFERENCES

Nachod et al.: Ion Exchange Technology, pp. 274-9 (1956).

Calmon et al.: Ion Exchangers in Organic and Biochemistry, pp. 658-9 (1957).